Jan. 27, 1970  SEIICHI YAMAGUCHI ET AL  3,492,474
REFLECTOR WITH COMPOUND CURVATURE REFLECTING SURFACE
Filed Feb. 2, 1967  7 Sheets-Sheet 6
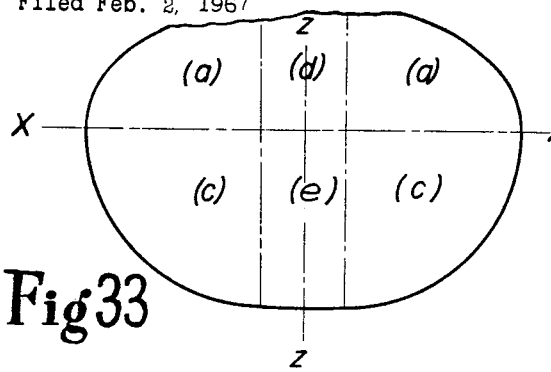
Fig 33
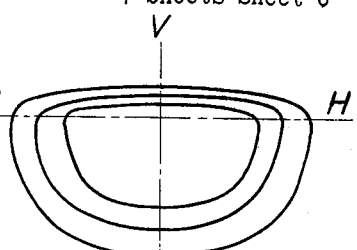
Fig 34
Fig 31
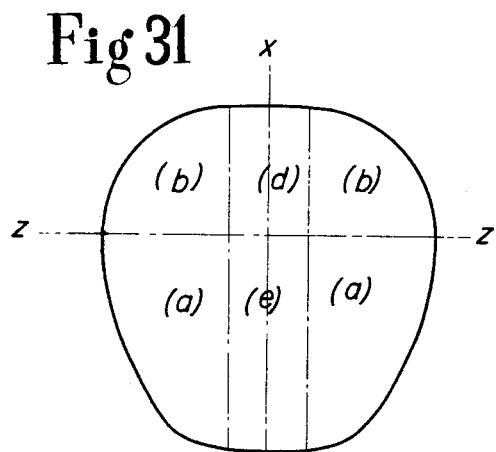
Fig 32
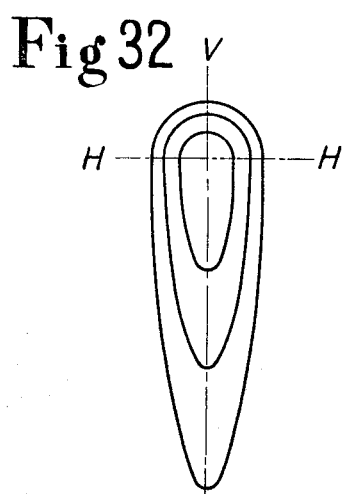
Fig 29
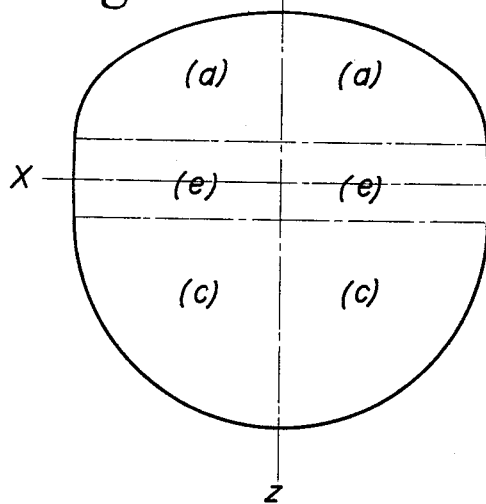
Fig 30
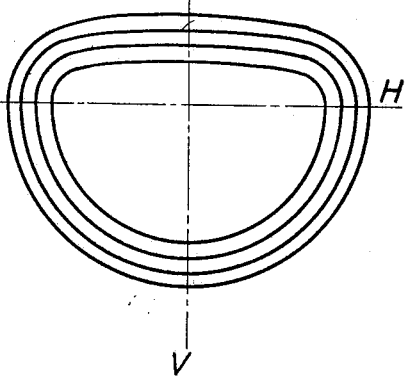
INVENTORS
SEIICHI YAMAGUCHI
SATOSHI HISHINUMA
BY McGlew & Toren
ATTORNEYS

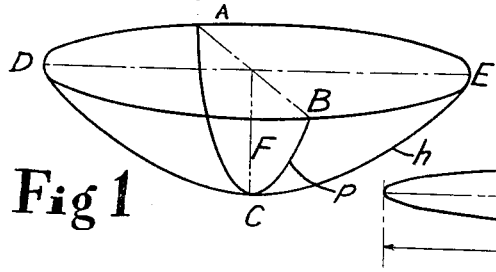
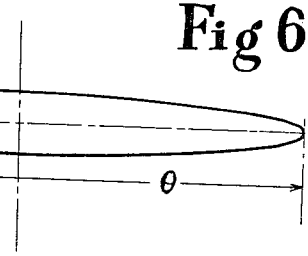
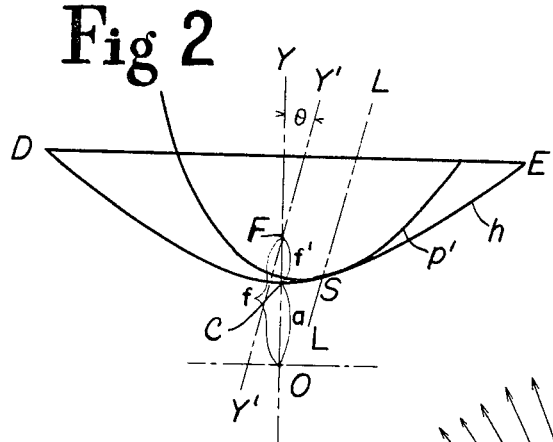
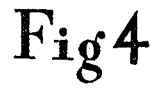
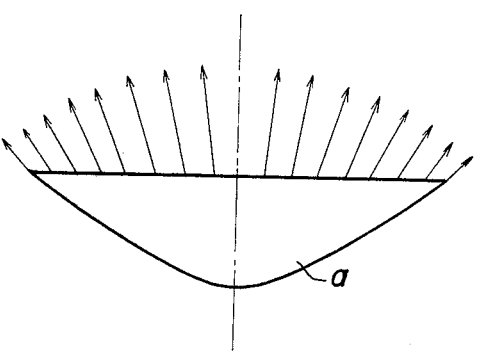
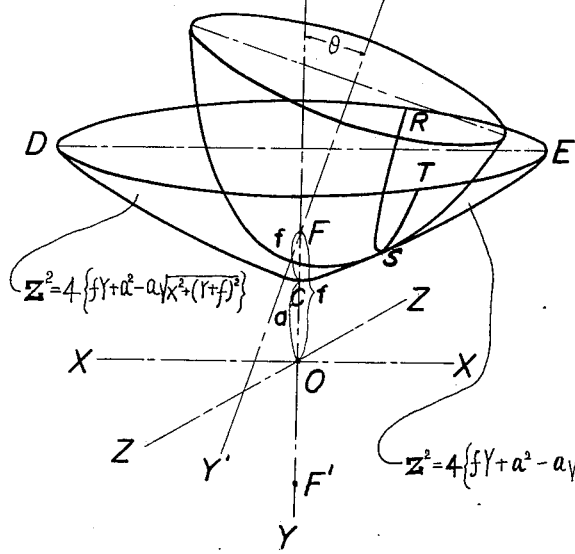
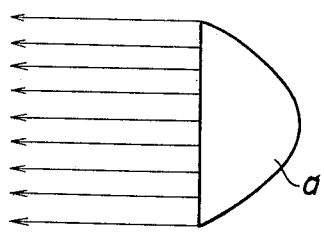

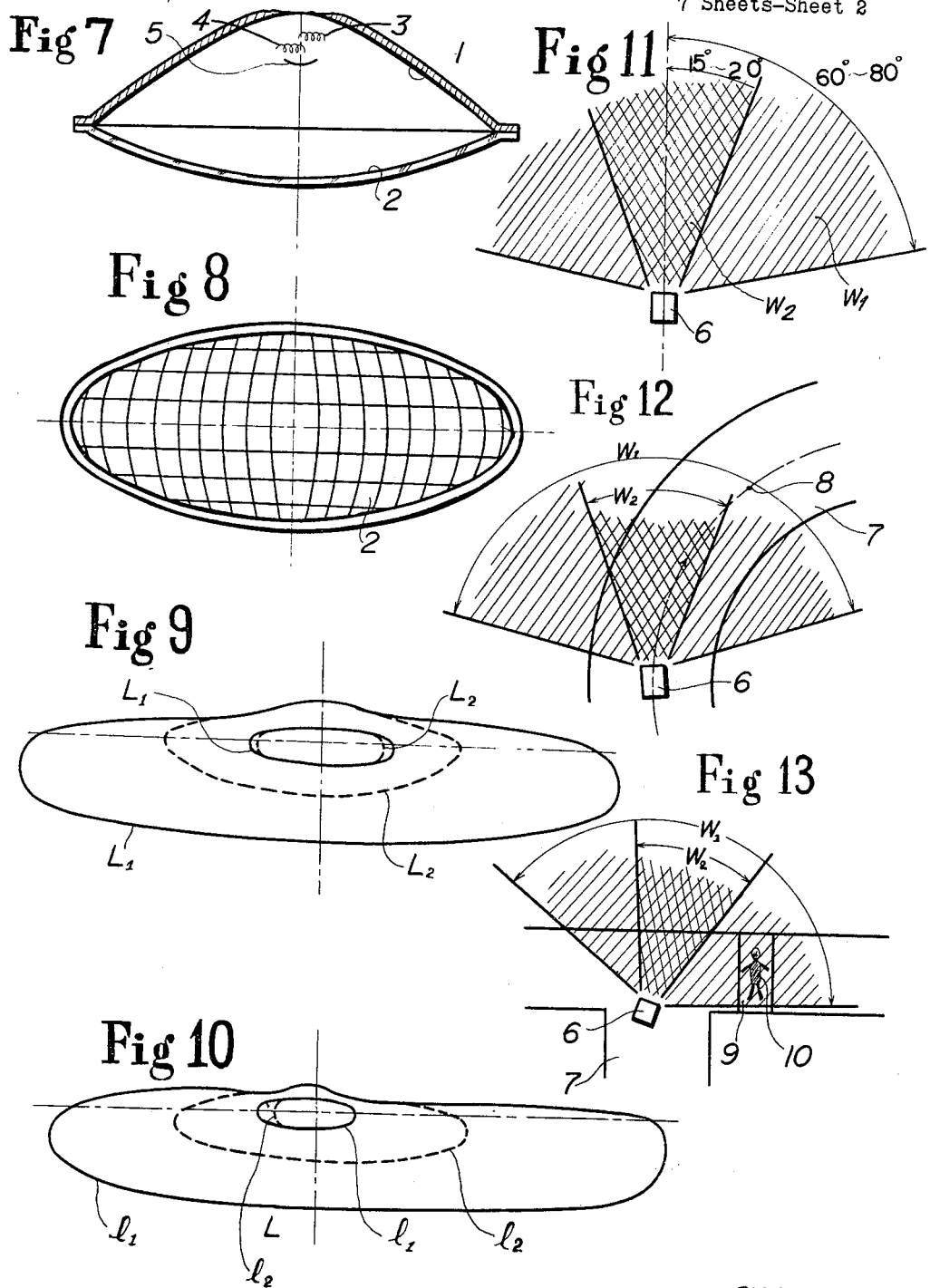

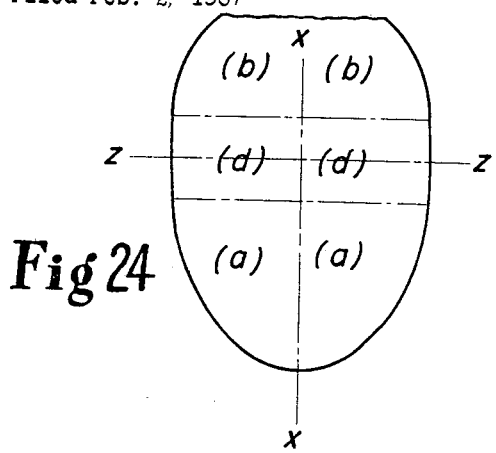
Fig 24
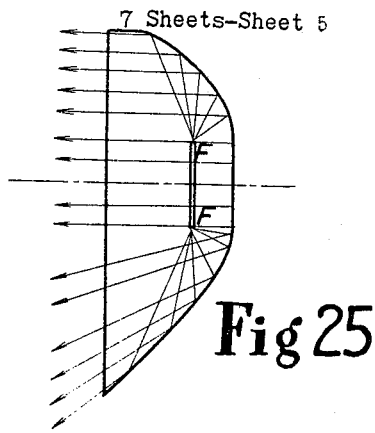
Fig 25
Fig 26
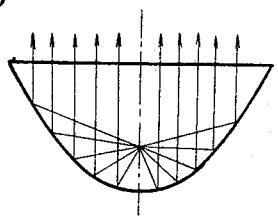
Fig 27
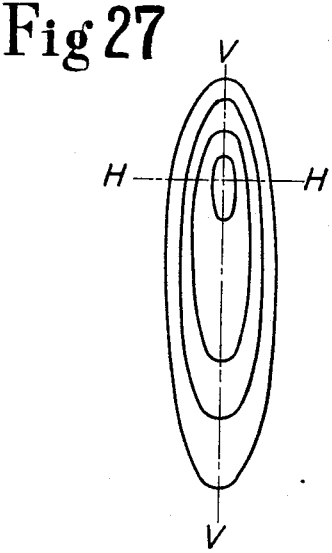
Fig 28
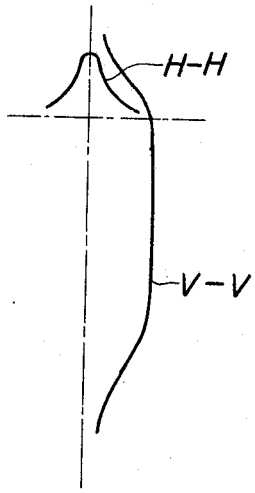

United States Patent Office 3,492,474
Patented Jan. 27, 1970

3,492,474
REFLECTOR WITH COMPOUND CURVATURE
REFLECTING SURFACE
Seiichi Yamaguchi, Saitama-ken, and Satoshi Hishinuma, Shizuoka-ken, Japan, assignors to Koito Manufacturing Co., Ltd., Tokyo, Japan
Filed Feb. 2, 1967, Ser. No. 613,471
Int. Cl. F21v 7/04
U.S. Cl. 240—103
17 Claims

ABSTRACT OF THE DISCLOSURE

A concavo-convex reflector has a periphery including a major axis and a minor axis, such as an oval or elliptical periphery, with at least part of the reflecting surface having a parabolic curvature in a plane including one of the two axes and at least part of the reflecting surface having a hyperbolic curvature in the plane including the other axis. In a general case, the reflecting surface may have a parabolic curvature in the plane of the minor axis, which is normally oriented vertically, and may have a hyperbolic curvature in the plane of the major axis, which normally is oriented horizontally. Within this general concept, the reflecting surface may have various compound curvatures including parabolic and hyperbolic curvatures generally extending normal to each other, and additional quadric or plane surfaces.

BACKGROUND OF THE INVENTION

This invention relates to reflectors, such as used, for example, in the headlamps of automobiles. More particularly, the present invention is directed to an improved reflector having a compound curvature reflecting surface including portions of parabolic curvature and portions of hyperbolic curvature.

Conventional reflectors for automobile headlamps are generally parabolic reflectors which are intended to provide a headlamp beam comprising parallel light rays which are directed generally horizontally. A difficulty with conventional headlamp reflectors of this type resides in the inability to provide sufficient illumination laterally of the vehicle path, and furthermore these conventional reflectors are objectionable in some respects due to the glare which inconveniences approaching drivers. More generally stated, the light distribution pattern in advance and laterally of a vehicle, using conventional headlamp reflectors, is unsatisfactory for many reasons.

A further problem encountered with conventional headlamps using parabolic reflectors is that of the upwardly directed curtain of light projected from the joints of lens steps. This curtain of light becomes blinding when reflected back into the eyes of the driver by fog, mist, rain, snow or dust. While there have been a considerable number of complicated arrangements used in an attempt to minimize this problem, none of these attempts has been completely successful. Furthermore, known arrangements intended to mitigate this blinding effect have been complicated and expensive to manufacture.

In accordance with the present invention, the problem is solved by providing a reflector or headlamp with a periphery having a major axis and a minor axis with its major axis extending substantially horizontally and its minor axis extending substantially vertically. The light distribution vertically of the headlamp corresponds to that provided by a parabolic reflector, but the light distribution horizontally of the headlamp corresponds to that provided by a hyperbolic reflector. To attain this, the reflecting surface of the reflector may have a parabolic curvature in the vertical direction and a hyperbolic curvature in the horizontal direction. In one embodiment of the invention, the reflecting surface has a single curved surface which is curved parabolically in the vertical direction and hyperbolically in the horizontal direction or horizontal plane. In other embodiments of the invention, the reflector surface may be one having a more complex compound curvature comprising, at least in part, special reflecting surfaces in addition to one or more of the usual quadric surfaces.

Accordingly, an object of the present invention is to provide a headlamp and a headlamp reflector having a greatly improved light distribution pattern.

Another object of the invention is to provide a headlamp including a reflector having its reflecting surface curved parabolically in the vertical direction and hyperbolically in the horizontal direction.

A further object of the invention is to provide a light reflector having a reflecting surface which, at least in part, is curved parabolically in one direction and hyperbolically in a direction at right angles to such one direction.

Yet another object of the invention is to provide an illuminator having a specific light distribution characteristic attained by the combination of a suitable light source, a suitable transparent or translucent cover or light-modifying lens, and a reflecting surface of one of the types mentioned above.

BRIEF DESCRIPTION OF THE DRAWINGS

For an understanding of the principles of the invention, reference is made to the following description of typical embodiments thereof as illustrated in the accompanying drawings.

In the drawings:

FIGS. 1, 2 and 3 are schematic diagrams graphically illustrating the principles of the present invention;

FIGS. 4 and 5 are plan and side elevation views, respectively, illustrating the pattern of the reflected luminous flux using a reflector whose entire reflecting surface is formed in accordance with the principles of the present invention;

FIG. 6 is a diagram graphically illustrating the light distribution characteristic of the reflector whose luminous flux distribution is shown in FIGS. 4 and 5;

FIG. 7 is a horizontal sectional view of an automotive headlamp incorporating a reflector having the light distribution pattern of FIG. 6;

FIG. 8 is a front elevation view of the headlamp shown in FIG. 7;

FIG. 9 is a diagram graphically illustrating the light distribution pattern of the upper beam of the headlamp shown in FIG. 7;

FIG. 10 is a diagram graphically illustrating the light distribution pattern of the lower beam of the headlamp shown in FIG. 7;

FIGS. 11, 12 and 13 are diagrams graphically illustrating the illumination on a road using a headlamp embodying the present invention as compared with that of a conventional automotive headlamp having a parabolic reflector;

FIGS. 24 through 28 are views corresponding to FIGS. 14 through 18, respectively of still another form of reflector having a reflecting surface embodying the present invention;

FIG. 29 is a front elevation view of a reflector having still another form of reflecting surface embodying the invention;

FIG. 30 is a diagram graphically illustrating the light distribution pattern of the reflector of FIG. 29;

FIG. 31 is a front elevation view of a reflector having a further form of reflecting surface embodying the present invention;

FIG. 32 is a diagram graphically illustrating the light distribution pattern or curve of the reflector of FIG. 31;

FIGS. 33, 35 and 37 are front elevation views of reflectors having other forms of reflecting surfaces embodying the invention; and FIGS. 34, 36 and 38 are diagrams graphically illustrating the light distribution patterns of the reflectors of FIGS. 33, 35 and 37, respectively.

DESCRIPTION OF THE PREFERRED EMBODIMENTS

Figure 14:
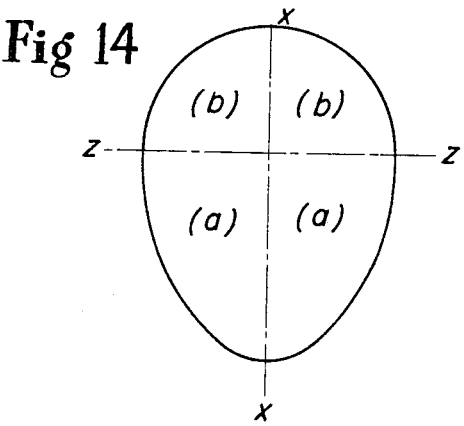
FIG. 14 is a front elevation view of a reflector having one form of reflecting surface embodying the invention.

Referring first to FIG. 1, a section DCE including the major axis of a reflector having an oval or elliptical periphery forms a hyperbola $h$ with the focal point F. A second section ACB including the minor axis of the reflector forms a parabola $p$ having the same focal point F as the hyperbola $h$. It will be noted that the plane of section ACB is substantially perpendicular to the plane of section DCE.

Referring to FIG. 2, a parabola $p'$ has its focal point F coincident with the focal point F of a hyperbola $h$, and the axis Y'—Y' of parabola $p'$ extends at the angle $\theta$ with respect to the axis Y—Y of hyperbola $h$. Parabola $p'$ contacts hyperbola $h$ at a point S. The point S is representative of a family of points at which parabola $p'$ will contact hyperbola $h$.

The relation between the angle of inclination $\theta$ of axis Y'—Y' and the focal length $f'$ of parabola $p'$ may be expressed as $f'=f \cos \theta - \alpha$. In this expression, O is the origin of a given hyperbola, and $f$ and $a$ may be derived respectively from $f=OF$ and $a=OC$ in FIG. 2.

FIG. 3 illustrates a paraboloid formed by rotating parabola $p'$ around axis Y'—Y'. It will be understood from the foregoing description that this paraboloid may have an infinite number of contact points with the hyperbola $h$, so that the surface obtained is an envelope comprising a group of these paraboloids.

Considering that the axes X—X, Y—Y and Z—Z are mutually perpendicular to each other at the origin O as shown in FIG. 3, such an envelope, which is a reflecting surface to be obtained, may be shown by the equation $$Z^2 = 4\{fy + a^2 - a\sqrt{X^2 + (Y+f)^2}\} \quad (1)$$

A section along the coordinate X—X including the major axis of this surface may be represented by Equation 1 wherein $Z=0$, that is, $$\frac{Y^2}{a^2} - \frac{X^2}{f^2 - a^2} = 1 \quad (2)$$

so that the section along the coordinate X—X and including the major axis is a hyperbola.

Similarly, the section along the coordinate Z—Z and including the minor axis of the same surface represents a parabola, since this section is defined by Equation 1 wherein $X=0$. That is, $$Z^2 = 4(f-a)(Y-a) \quad (3)$$

A locus on this latter surface at which a parallel luminous flux, inclined at an angle $\theta$ with respect to the axis Y—Y, such as represented by the locus RST of the points forming a paraboloid inclined at an angle $\theta$ as shown in FIG. 3, and contacting the surface defined by Equation 1, coincides exactly with the section L—L of FIG. 2 which is parallel to the axis Y'—Y' of the paraboloid. Section L—L forms a parabola, and a plane including section L—L also includes the second focal point F' of the hyperbola and is parallel to the coordinate Z—Z while obliquely intersecting the coordinate Y—Y at the angle $\theta$.

The foregoing is true for the entire surface defined by Equation 1. Consequently, a luminous flux projected onto this surface from a light source placed at the focal point F provides, in the horizontal direction, a uniformly diffusing luminous flux, as shown in FIG. 4, due to the reflection characteristic of a hyperbola. In the vertical direction, this provides a parallel ray luminous flux, as shown in FIG. 5, due to the reflection characteristic of a parabola. As a result, the light distribution characteristic shown in FIG. 6 is obtained.

It will be apparent from Equation 1 of the envelope or surface that the surface may be determined by a hyperbola $h$. Thus, if the major diameter X, the maximum inclination angle $\theta$ and the focal length $f$ are known, the minor diameter Z, the depth Y and the substantially oval periphery may be determined. As will be understood from the foregoing description, the invention provides a reflecting surface which is a single surface determined by a given equation, namely Equation 1, and a single focal point, and wherein the entire luminous flux projection on the surface from a light source placed at the focal point F may be reflected in accordance with a given rule. The principles of the invention may be carried out by constructing a reflector using the special reflecting surface just described as the entire reflecting surface, or by constructing a reflector using the just described reflecting surface in combination with other quadric surfaces.

A vehicle headlamp utilizing the reflector $a$ as shown in FIGS. 4 and 5, having the reflecting surface described above constituting the entire reflecting surface, will be described with reference to FIGS. 7 to 13. Referring to FIGS. 7 and 8, the vehicle headlamp is illustrated as including a reflector 1 having a reflecting surface provided with a coating of suitable reflecting material, a transparent or translucent cover or light-modifying lens 2, a high beam filament 3, a low beam filament 4 and a filament shield 5. The light distribution of this vehicle headlamp includes the light due to the high beam in which the luminous flux is used for distant illumination and desirably has a horizontal diffusion, and the luminous flux due to the low beam wherein, desirably, the upwardly directed luminous flux is greatly limited, above a substantially horizontal plane intersecting the headlamp, to protect the eyes of approaching drivers against glare.

The invention reflector has, as shown in FIG. 6, a light distribution characteristic of such a nature that the quantity of luminous flux increases in the vicinity of the center and continuously decreases toward the periphery. Thus, the center of the reflector may have associated therewith a light-modifying lens to provide the long range light beam for the high beam filament. If the periphery is so constructed that the light flux diffusion for short range lumination can be provided, the reflector can illuminate uniformly a wide area of road surface as well as provide a wide diffusion angle which cannot be provided by conventional types of headlamps. Thus, it is possible to provide illumination over the entire visibility range of the driver.

With respect to any upwardly directed luminous flux during use of the low beam filament, it will be noted that the reflected flux is directed parallel to a horizontal plane, as can be seen from FIG. 5. Thus, the invention reflector directs the flux horizontally in the same manner as with a conventional parabolic reflector. However, the effective control of glare by the invention headlamp is better than that of the conventional headlamp having a parabolic reflector. This is due to the fact that the ratio of the brightness between the center zone and a zone far distant from the center, in the beam pattern of light distribution as shown in FIG. 10, is very low as compared with the conventional headlamp having a parabolic reflector.

FIGS. 9 and 10 indicate the light distribution curve as compared with that of a conventional headlamp. In FIG. 9, the light distribution curve $L_1$ of the "high beam" of the invention headlamp as compared with the light distribution $L_2$ of a conventional headlamp having a parabolic reflector. In FIG. 10, the light distribution curve $l_1$ of the "low beam" of the invention headlamp is compared with the light distribution curve $l_2$ of a conventional headlamp having a parabolic reflector. It will be noted, from both FIGS. 9 and 10, that the upper limit of the light rays is substantially the same for the invention headlamp as for a conventional headlamp having a parabolic reflector. However, there is a greatly increased depth of light, below the horizontal plane intersecting the headlamp, with the invention headlamp as compared with a conventional headlamp. Correspondingly, both the high beam and the low beam are much wider laterally of the path of travel with the invention headlamp than with the conventional headlamp having a parabolic reflector.

FIGS. 11, 12 and 13 illustrate the illuminating range $W_1$ of the invention headlamp as compared with the illuminating range $W_2$ of a conventional headlamp having a parabolic reflector. In these figures, the objects to be illuminated include a vehicle 6, a road 7, a road marker 8, such as "Under Construction" or "One Way," a pedestrian crossing 9 and a pedestrian 10. Thus, and referring to FIG. 11, when the vehicle 6 is proceeding in a straight line, the width of the beam of the invention headlamp, extending laterally from the center line of the vehicle direction, is from 60 to 80° as compared to the 15 to 20° width provided by a conventional headlamp. If the vehicle is proceeding around a curve, as shown in FIG 12, the invention headlamp will illuminate a much greater proportion of the curved surface of the road 7 and will furthermore illuminate the marker 8 well in advance of the time at which such marker would be illuminated by a conventional headlamp. FIG. 13 represents the vehicle 6 as making a right turn adjacent the pedestrian crossing 9 having a pedestrian 10 walking thereacross. As the vehicle 6 makes only a slight turn, the wide beam provided by the invention headlamp clearly illuminates both the pedestrian crossing 9 and the pedestrian 10 whereas, with the light beam from a conventional headlamp having a parabolic reflector, neither the pedestrian crossing 9 nor the pedestrian crossing 10 are illuminated until the vehicle has made a much greater degree of turning movement.

Conventionally, the simplest method of designing lenses to provide parallel light rays has been to use a parabolic reflector. Correspondingly, the invention reflector is parabolic in a vertical plane and thus provides parallel light rays extending substantially horizontally. However, the invention reflector has a hyperbolic curvature in the horizontal plane, whereby a laterally much wider light beam distribution is provided as compared to a conventional headlamp having a parabolic reflector. As previously stated, a conventional headlamp having a parabolic reflector has the disadvantage that the upwardly directed curtain of spill light projected from the joints of lens steps becomes blinding when reflected back into the driver's eyes by fog, mist, rain, snow, dust or the like. The invention reflector, however, can be designed to provide a diffused light beam so that the undesirable flux which may be projected from the lens joints is not concentrated light but diffused light, and therefore the upwardly directed spill light curtain may be completely avoided or eliminated.

From the foregoing description, it will be apparent that the front configuration or periphery of the invention reflector may be selected as a function of the focal length and the maximum angle of inclination of the reflected light. Consequently, the invention headlamp may have a substantially oval or rectangular periphery having its major dimension or axis in the horizontal direction and its minor dimension or axis in the vertical direction. Thus, a single reflector of high efficiency may be used to provide a novel design of headlamp and this is an important factor in the design of cars from the appearance standpoint.

The many advantages of the invention reflector may be summarized as follows:

(1) It is easy to provide a headlamp having a laterally widely diffused light beam and, as seen in FIGS. 11, 12 and 13, this greatly improves the road illumination not only when the vehicle is traveling straight ahead but also when the vehicle is traveling on a curve, thus increasing the security with respect to obstacles which must be illuminated.

(2) A low beam is provided which substantially eliminates dazzle.

(3) The lense design may be simplified.

(4) A headlamp using the invention reflector is free of the undesirable upwardly directed curtain of "spilled" light.

(5) The front face or periphery of the headlamp may be shaped advantageously for the design of the body of the vehicle, such as having an oval or rectangular shape.

Thus, a reflector having its entire reflecting surface formed as described above is readily adaptable for use in automotive vehicle headlamps.

It should be furthermore understood that the reflector of the invention may provide a projector for general lighting having a light distribution characteristic which can be properly combined with a suitable light source, a suitable cover glass, a suitable light-modifying lens, and other components, with the reflector having its entire reflecting surface formed in the manner described above. Additionally, a reflector according to the invention may include the above mentioned special reflecting surface and a quadric surface. It is thus possible to provide an improved reflector for various types of floodlights, illuminators, etc. Such an improved reflector will include, in part, a reflecting surface described above and defined by Equation 1 and a part comprising another quadric surface as a parabolic or a hyperboloid. This will be apparent from a consideration of Equations 1, 2 and 3.

Thus, as will be apparent from Equations 2 and 3, the joint or juncture between the reflecting surface defined by Equation 1 and a selected quadric surface is optically continuous and is not accompanied by any abnormal reflection. For this reason, it is possible to provide a reflector combining the reflecting characteristics of the reflecting surface described above with the reflecting characteristics of various kinds of quadric surfaces.

FIGS. 14 through 38 illustrate a reflector having a complex compound curvature.

Figure 15:
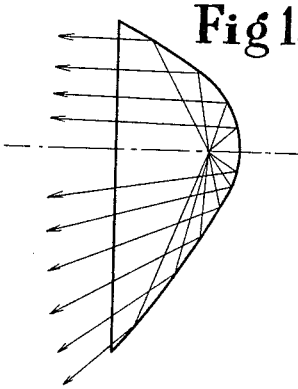
FIGS. 15 and 16 are sectional views taken on the lines X—X and Z—Z of FIG. 14.
Figure 16:
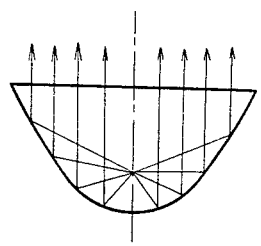
Figure 17:
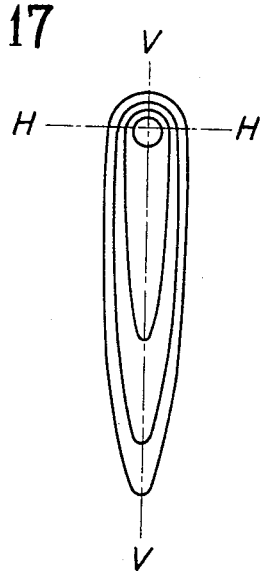
FIG. 17 is a diagram graphically illustrating the light distribution curve of the reflector shown in FIGS. 14, 15 and 16.
Figure 18:
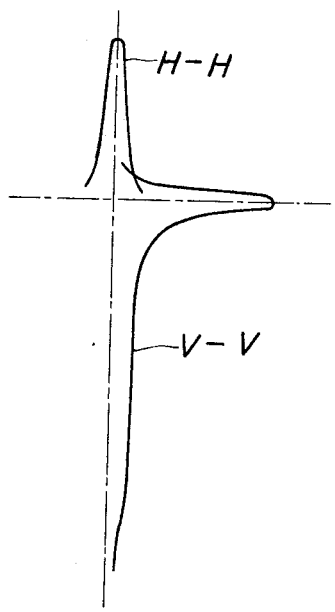
FIG. 18 is a diagram graphically illustrating the luminous intensity at the sections H—H and V—V of FIG. 17.
Figure 19:
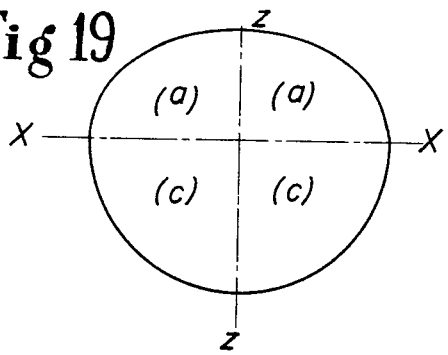
FIGS. 19 through 23 are views, corresponding respectively to FIGS. 14 through 18, of a reflector having another form of reflecting surface embodying the invention.
Figure 20:
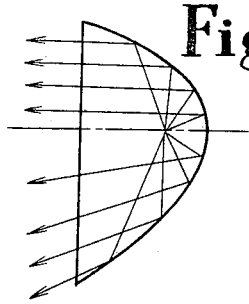
Figure 21:
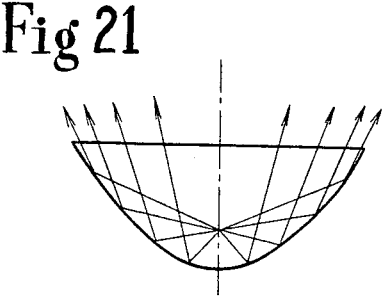
Figure 22:
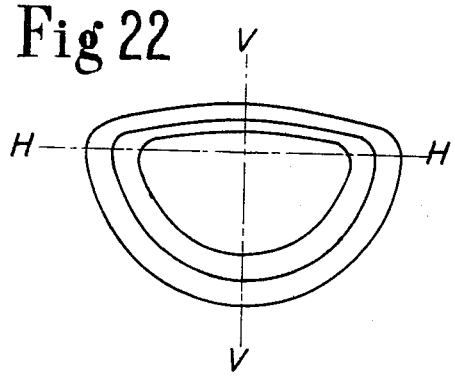
Figure 23:
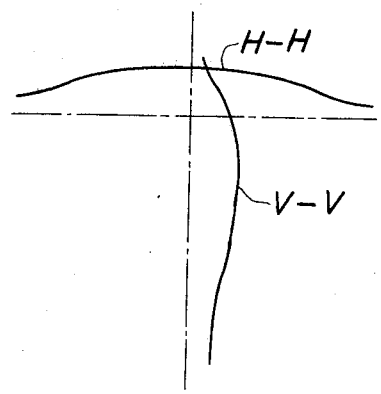

Referring to FIGS. 14 through 18, the reflector illustrated therein includes a reflecting surface $a$ defined by Equation 1 and a paraboloid $b$ defined by Equation 3. The light rays, considered in a vertical plane, are illustrated in FIG. 15 and the light rays, considered in a horizontal plane, are illustrated in FIG. 16. The light distribution characteristic of the reflecting surface shown in FIG. 14 is such that there is a relatively high luminous intensity at the central zone, and a narrow band-type light distribution in a selected direction, as will be apparent from FIGS. 17 and 18. A light distribution pattern of this type is useful in road illumination, illumination of pedestrian crossings, and the like.

FIGS. 19 through 23 illustrate a reflector having a reflecting surface $a$, as defined by Equation 1 and a hyperboloid surface $c$, as defined by Equation 2. The reflecting characteristics of this surface are shown, with respect to a vertical plane, in FIG. 20 and, with respect to a horizontal plane, in FIG. 21. The light distribution characteristic of the surface of the reflector of FIG. 19 includes a narrow band of diffused light distribution provided by the reflecting surface *a* and a circularly diffused light distribution provided by the hyperboloid surface *c*. These are shown more particularly in FIGS. 22 and 23. The reflector of FIGS. 19 through 23 thus has a wide range of uniform distribution of luminous intensity, so that it is useful for illuminators or projectors installed along the road, on city streets, and on buildings or the like, as well as being useful for signals, etc.

Various other types of reflecting surfaces may be provided in accordance with the invention, such as shown, for example, in FIGS. 24 through 28. The reflectors shown in these figures include a reflecting surface *a* defined by Equation 1, a paraboloid *b* and an intermediate parabolic cylinder *d* interposed between surfaces *a* and *b*. The light ray directions are shown, with respect to a vertical plane, in FIG. 25 and, with respect to a horizontal plane in FIG. 26, whereas FIGS. 27 and 28 illustrate the light distribution pattern.

FIGS. 29 and 30 illustrate a reflector embodying the invention and including a reflecting surface *a* as defined by Equation 1, a hyperboloid *c*, and a hyperbolic cylinder *e* interposed between surfaces *a* and *c*. The light distribution pattern is illustrated in FIG. 30.

In FIGS. 31 and 32, the reflector includes a reflecting surface *a* as defined by Equation 1, a paraboloid *b*, a parabolic cylinder *d*, and a hyperbolic cylinder *e*, the light distribution pattern being shown in FIG. 32.

FIGS. 33 and 34 illustrate a reflector embodying the invention and including a reflecting surface *a* as defined by Equation 1, a hyperboloid *c*, a parabolic cylinder *d*, and a hyperbolic cylinder *e*. The light distribution pattern of this reflector is shown in FIG. 34.

Figure 35:
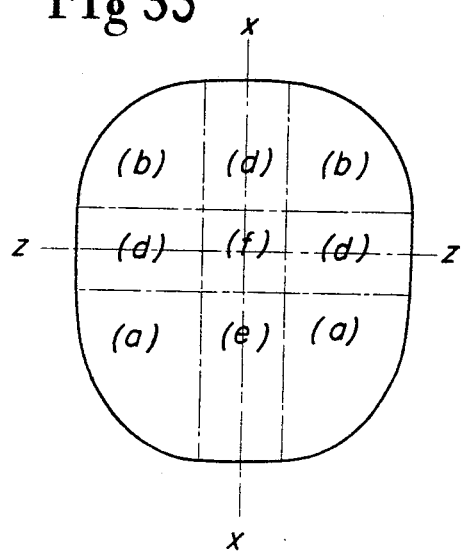
Figure 36:
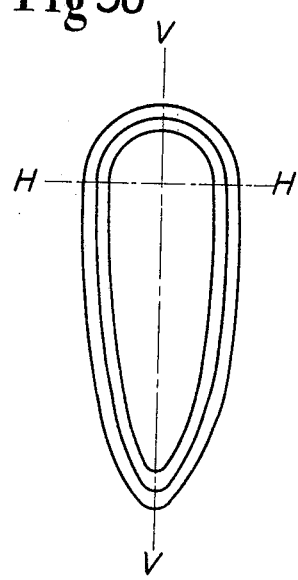

FIGS. 35 and 36 show a reflector embodying the invention and including a reflecting surface *a* as defined by Equation 1, a paraboloid *b*, a parabolic cylinder *d*, a hyperbolic cylinder *e*, and a plane surface *f*. The light distribution characteristic of this particular reflector is shown in FIG. 36.

Figure 37:
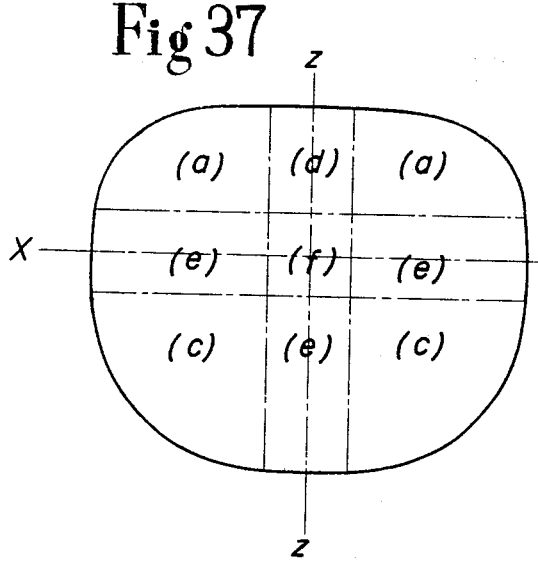
Figure 38:
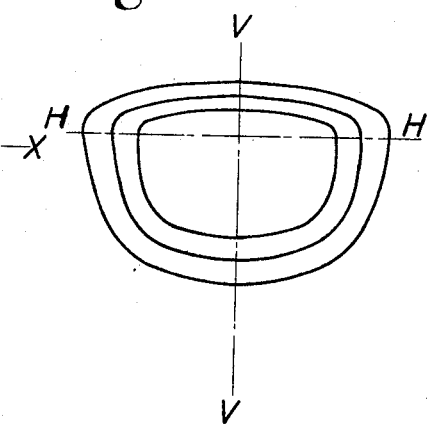

FIGS. 37 and 38 show a further reflector embodying the invention and including a reflecting surface *a* as defined by Equation 1, a hyperboloid *c*, a parabolic cylinder *d*, a hyperbolic cylinder *e*, and a plane surface *f*. The light distribution of this reflector is shown in FIG. 38.

From the foregoing, it will be apparent that the reflectors shown in FIGS. 14 through 38 have compound or complex curved surfaces defined by Equations 1, 2 and 3, as well as plane surfaces.

The reflectors shown in FIGS. 14 through 38 have many advantages. Thus, they can effect a uniformly spread light distribution, which has not been attained hitherto. Additionally, the diffusion angle of the reflected beam may be controlled by the constants *a* and *f* of Equation 1. The joints between surfaces of various curvature are optically theoretically continuous, so that there is no abnormal reflection.

Additionally, a reflector may be provided, utilizing the principles of the invention, which is adapted to any given application. A reflector, of the type mentioned above, having a cylindrical surface or a plane surface may be provided for a large-sized light source without affecting the light distribution characteristic of its original reflector. The optical duties of the cover glass or light-modifying lens may be lightened by the invention reflector, and it is possible to diffuse the light more widely by the lens because the reflector itself provides a diffused light pattern. Evaluation of this surface may be easily effected as compared with the evaluation of a conventional type of reflector. Finally, all of the reflectors are characterized by a novel design.

What is claimed is:

1. A concavo-convex reflector with a periphery including a major axis and a minor axis, and having a reflecting surface at least part of which has a curvature defined by the equation $$Z^2 = 4\{fY + a^2 - a\sqrt{X^2 + (Y+f)^2}\}$$

wherein $a$ and $f$ are constants and X, Y and Z are measured along mutually perpendicular coordinates; said curvature being a hyperbola in a plane including the major axis and a parabola in a plane including the minor axis.

2. A reflector, as claimed in claim 1, in which said reflecting surface is divided into two portions by equating X to be zero in said equation; one portion of said reflecting surface having a curvature defined by said equation, and the other portion of said reflecting surface having a curvature constituting a surface of a paraboloid having a focus common with that of the reflecting surface defined by said equation.

3. A reflector, as claimed in claim 1, in which said reflecting surface is divided into two portions by equating Z to be zero in said equation; one portion of said reflecting surface having a curvature defined by said equation, and the other portion of said reflecting surface having a curvature constituting a surface of a hyperboloid having its focus common with that of the reflecting surface defined by said equation.

4. A reflector, as claimed in claim 2, in which said reflecting surface has a third portion, intermediate said two portions, and constituting the surface of a parabolic cylinder.

5. A reflector, as claimed in claim 3, in which said reflecting surface has a third portion, intermediate said two portions, and constituting the surface of a hyperbolic cylinder.

6. A reflector having a reflecting surface at least part of which has a curvature defined by the equation $$Z^2 = 4\{fY + a^2 - a\sqrt{X^2 + (Y+f)^2}\}$$

wherein $a$ and $f$ are constants and X, Y and Z are measured along mutually perpendicular coordinates; said reflecting surface being divided into four equi-angular quadrants; said reflecting surface, in two adjacent quadrants, having a curvature defined by said equation and, in the other two adjacent quadrants, having a curvature constituting a surface of a paraboloid.

7. A reflector, as claimed in claim 6, in which the portion of said reflecting surface having a curvature defined by said equation is divided into two spaced sections separated by a first intermediate section whose curvature constitutes the surface of a hyperbolic cylinder; said portion of said reflecting surface constituting the surface of a paraboloid being divided into two additional sections separated by a second intermediate section constituting the surface of a hyperbolic cylinder.

8. A reflector having a reflecting surface at least part of which has a curvature defined by the equation $$Z^2 = 4\{fY + a^2 - a\sqrt{X^2 + (Y+f)^2}\}$$

wherein $a$ and $f$ are constants and X, Y and Z are measured along mutually perpendicular coordinates; said reflecting surface being divided into four equi-angular quadrants; said reflecting surface, in two adjacent quadrants, having a curvature defined by said equation and, in the other two adjacent quadrants, having a curvature constituting a surface of a hyperboloid.

9. A reflector, as claimed in claim 8, in which the portion of said reflecting surface having a curvature defined by said equation is divided into two spaced sections separated by a first intermediate section constituting the surface of a parabolic cylinder; said portion of said reflecting surface constituting the surface of a hyperboloid being divided into two additional spaced sections separated by a second intermediate section constituting the surface of a hyperbolic cylinder.

10. A reflector having a reflecting surface at least part of which has a curvature defined by the equation $$Z^2 = 4\{fY + a^2 - a\sqrt{X^2 + (Y+f)^2}\}$$

wherein $a$ and $f$ are constants and X, Y and Z are measured along mutually perpendicular coordinates; said reflecting surface including a first portion whose curvature is defined by said equation, a second portion spaced from said first portion and constituting the surface of a paraboloid, and a third portion, intermediate said first and second portion, and constituting the surface of a paraboloid cylinder.

11. A reflector, as claimed in claim 10, in which the portion of said reflecting surface having a curvature defined by said equation constitutes a first portion which is separated from the portion of said reflecting surface constituting the surface of a paraboloid, and constituting a second portion, by a third portion constituting the surface of a parabolic cylinder; said first portion being sub-divided into two sections separated by a first intermediate section constituting the surface of a hyperbolic cylinder; said second portion being sub-divided into two additional sections separated by a second intermediate portion constituting the surface of a parabolic cylinder; said third portion being divided into two further sections separated by a third intermediate section constituting a plane surface.

12. A reflector having a reflecting surface at least part of which has a curvature defined by the equation $$Z^2 = 4\{fY + a^2 - a\sqrt{X^2 + (Y+f)^2}\}$$

where $a$ and $f$ are constants and X, Y and Z are measured along mutually perpendicular coordinates; said reflecting surface being divided into a first portion having a curvature defined by said equation, a second portion spaced from said first portion and having a curvature constituting the surface of a hyperboloid, and a third portion, intermediate said first and second portions, and having a curvature constituting the surface of a hyperbolic cylinder.

13. A reflector, as claimed in claim 2, in which said one portion of said reflecting surface is divided into two parts separated by a third portion constituting the surface of a hyperbolic cylinder; said other portion of said reflecting surface being divided into two parts separated by a fourth portion constituting the surface of a parabolic cylinder.

14. A reflector, as claimed in claim 3, in which said one portion of said reflecting surface is divided into two parts separated by a third portion constituting the surface of a parabolic cylinder; said other portion of said reflecting surface being divided into two parts separated by a fourth portion constituting the surface of a hyperbolic cylinder.

15. A reflector, as claimed in claim 4, in which said one portion of said reflecting surface is divided into two parts separated by a fourth portion constituting the surface of a hyperbolic cylinder; said other portion of said reflecting surface being divided into two parts separated by a fifth portion constituting the surface of a second parabolic cylinder; said third portion being divided into two parts separated by a plane surface located between said first mentioned parabolic cylinder and said hyperbolic cylinder.

16. A reflector, as claimed in claim 5, in which said one portion of said reflecting surface is divided into two parts separated by a fourth portion constituting the surface of a parabolic cylinder; said other portion of said reflecting surface being divided into two parts separated by a fourth portion constituting the surface of a second hyperbolic cylinder; said third portion being divided into two parts separated by a plane portion which is disposed between said parabolic cylinder and said second hyperbolic cylinder.

17. A reflector, as claimed in claim 12, in which said portion of said reflecting surface having a curvature defined by said equation constitutes a first portion which is separated from the portion constituting the surface of a hyperboloid, and constituting a second portion, by an intermediate third portion constituting the surface of a hyperbolic cylinder; said first portion being sub-divided into two sections separated by a first intermediate section constituting the surface of a parabolic cylinder; said second portion being divided into two additional sections separated by a second intermediate section constituting the surface of a hyperbolic cylinder; said third portion being sub-divided into two further sections separated by a third intermediate section constituting a plane surface.

References Cited

UNITED STATES PATENTS

| | | | |
|---|---|---|---|
| 254,578 | 3/1882 | Wheeler | 240—103 |
| 1,306,511 | 6/1919 | Ames | 240—41.35 |
| 1,793,663 | 2/1931 | Wood | 240—41.37 |
| 2,739,226 | 3/1956 | Rex | 240—25 |

FOREIGN PATENTS 142,812 9/1921 Great Britain.

NORTON ANSHER, Primary Examiner

ROBERT P. GREINER, Assistant Examiner

U.S. Cl. X.R.

240—41.35, 41.37